United States Patent
Kaepp et al.

(10) Patent No.: US 6,969,084 B2
(45) Date of Patent: Nov. 29, 2005

(54) AUTOMOTIVE BUMPER WITH INTEGRAL HITCH COVER

(75) Inventors: Gregory A. Kaepp, Dearborn, MI (US); Conrad M. Kudelko, Livonia, MI (US); Robert T. Laster, Wixom, MI (US); Irfan Sharif, Canton, MI (US)

(73) Assignee: Ford Global Technologies Inc., Dearborn, MI (US)

( * ) Notice: Subject to any disclaimer, the term of this patent is extended or adjusted under 35 U.S.C. 154(b) by 0 days.

(21) Appl. No.: 10/605,341

(22) Filed: Sep. 23, 2003

(65) Prior Publication Data

US 2004/0104557 A1 Jun. 3, 2004

Related U.S. Application Data

(63) Continuation-in-part of application No. 10/352,304, filed on Jan. 27, 2003, now Pat. No. 6,739,613, which is a division of application No. 09/910,772, filed on Jul. 23, 2001, now Pat. No. 6,581,955, which is a continuation-in-part of application No. 09/698,711, filed on Oct. 27, 2000, now Pat. No. 6,502,848, which is a continuation of application No. 09/296,185, filed on Apr. 26, 1999, now Pat. No. 6,179,320.

(51) Int. Cl.[7] .............................. B60D 1/00; B60D 1/60
(52) U.S. Cl. ........................ 280/500; 280/507; 293/117
(58) Field of Search ................................ 280/495, 500, 280/507, 491.5; 293/121, 122, 106, 117

(56) References Cited

U.S. PATENT DOCUMENTS

| | | |
|---|---|---|
| 1,581,432 A | 4/1926 | Fageol |
| 1,935,447 A | 11/1933 | Hoffman |
| 2,604,349 A | 7/1952 | Martinetz |
| 2,753,193 A | 7/1956 | Halverson |
| 2,828,144 A | 3/1958 | Hosmer |
| 3,412,628 A | 11/1968 | Degain |
| 3,495,474 A | 2/1970 | Nishimura et al. |
| 3,578,358 A | 5/1971 | Reynolds |
| 3,717,362 A | 2/1973 | Johnson |
| 3,739,882 A | 6/1973 | Schwenk et al. |
| 3,819,224 A | 6/1974 | Casey et al. |
| 3,831,997 A | 8/1974 | Myers |
| 3,863,956 A | 2/1975 | Khan |
| 3,885,817 A | 5/1975 | Christian |
| 3,888,515 A | 6/1975 | Winter |
| 3,897,095 A | 7/1975 | Glance et al. |
| 3,905,630 A | 9/1975 | Cantrell |
| 3,912,295 A | 10/1975 | Eggert, Jr. |
| 3,930,670 A | 1/1976 | Haskins |
| 3,938,841 A | 2/1976 | Glance et al. |
| 3,964,768 A | 6/1976 | Reynolds |
| 3,997,207 A | 12/1976 | Norlin |
| 3,998,485 A | 12/1976 | Putter et al. |
| 4,023,652 A | 5/1977 | Torke |
| 4,109,930 A | 8/1978 | Philhall |
| 4,131,308 A * | 12/1978 | Holka et al. ............. 296/180.5 |
| 4,190,276 A | 2/1980 | Hirano et al. |
| 4,272,114 A | 6/1981 | Hirano et al. |

(Continued)

FOREIGN PATENT DOCUMENTS

| | | |
|---|---|---|
| DE | 2137517 | 2/1973 |
| GB | 2307665 | 11/1995 |

*Primary Examiner*—Kevin Hurley
(74) *Attorney, Agent, or Firm*—Gigette M. Bejin; Dykema Gossett PLLC

(57) ABSTRACT

A bumper assembly for a motor vehicle includes a bumper structure having a bumper beam adapted for attachment to a structure of a motor vehicle such as a frame or rails, or the like. A hitch is attached to the bumper beam, and a bumper cover conceals the bumper beam. The bumper cover has an opening for accessing the hitch and an access door for selectively concealing the hitch. The access door is mounted to the bumper structure such that the access door will be retained upon the bumper structure not only when the access door is concealing the hitch but also when the access door is open to allow an accessory such as a trailer to be coupled to the hitch.

17 Claims, 5 Drawing Sheets

U.S. PATENT DOCUMENTS

| | | |
|---|---|---|
| 4,465,312 A | 8/1984 | Werner |
| 4,468,052 A | 8/1984 | Koike |
| 4,634,163 A | 1/1987 | Bundy et al. |
| 4,738,464 A | 4/1988 | Putnam |
| 4,829,979 A | 5/1989 | Moir |
| 4,830,686 A | 5/1989 | Hashiguchi et al. |
| 4,893,856 A | 1/1990 | Council |
| 4,901,486 A | 2/1990 | Kobori et al. |
| 5,080,411 A | 1/1992 | Stewart et al. |
| 5,094,469 A | 3/1992 | Yamamoto et al. |
| 5,116,092 A | 5/1992 | Schonleber |
| 5,154,462 A | 10/1992 | Carpenter |
| 5,184,840 A | 2/1993 | Edwards |
| 5,201,912 A | 4/1993 | Terada et al. |
| 5,273,330 A | 12/1993 | Petry et al. |
| 5,314,229 A | 5/1994 | Matuzawa et al. |
| 5,364,142 A | 11/1994 | Coiner |
| 5,387,002 A | 2/1995 | Grevich |
| 5,419,416 A | 5/1995 | Miyashita et al. |
| 5,431,445 A | 7/1995 | Wheatley |
| 5,560,631 A | 10/1996 | Salvo |
| 5,620,218 A | 4/1997 | Saltzman |
| 5,628,536 A | 5/1997 | Fulkerson |
| 5,688,006 A | 11/1997 | Bladow et al. |
| 5,722,708 A | 3/1998 | Jonsson |
| 5,727,804 A | 3/1998 | Metzger |
| 5,732,801 A | 3/1998 | Gertz |
| 5,785,367 A | 7/1998 | Baumann et al. |
| 5,803,514 A | 9/1998 | Shibuya et al. |
| 5,829,774 A | 11/1998 | Klemp |
| 5,853,187 A | 12/1998 | Maier |
| 5,876,078 A | 3/1999 | Miskech et al. |
| 5,934,699 A | 8/1999 | Blake |
| 6,139,044 A | 10/2000 | Smith et al. |
| 6,145,865 A | 11/2000 | Cannara et al. |
| 6,149,181 A | 11/2000 | Biederman |
| 6,176,506 B1 | 1/2001 | Blake |
| 6,179,320 B1 | 1/2001 | Chou et al. |
| 6,189,910 B1 | 2/2001 | Bartel |
| 6,318,748 B1 | 11/2001 | Hery |
| 6,481,734 B1 | 11/2002 | Blake |
| 6,502,848 B1 | 1/2003 | Chou et al. |
| 6,581,955 B2 | 6/2003 | Aquinto et al. |

* cited by examiner

AUTOMOTIVE BUMPER WITH INTEGRAL HITCH COVER

The present application is a continuation-in-part of U.S. patent application Ser. No. 10/352,304 filed on Jan. 27, 2003 now U.S. Pat. No. 6,739,613 which is a divisional application of U.S. patent application Ser. No. 09/910,772, filed Jul. 23, 2001, now U.S. Pat. No. 6,581,955, which is a continuation-in-part of U.S. patent application Ser. No. 09/698,711, filed Oct. 27, 2000, now U.S. Pat. No. 6,502,848, which is a continuation of U.S. patent application Ser. No. 09/296,185, filed Apr. 26, 1999, now U.S. Pat. No. 6,179,320.

BACKGROUND OF INVENTION

1. Field of the Invention

The present invention relates to an automotive bumper having an integral hitch receiver contained within a space defined by the bumper, and an integral cover for selectively enclosing said space and said hitch receiver. As used herein, the term "hitch receiver" means either a drawbar to which a hitch ball or other hitching device may be mounted, or a tubular socket, typically having a square opening, for accepting a drawbar hitch.

2. Disclosure Information

At one time, trailer hitches, particularly receiver type hitches, were the exclusive province of more rugged utility vehicles such as pickup trucks. As employed with a pickup truck, a typical receiver hitch provides a level of aesthetics generally in keeping with more rugged vehicles. However, as trailer towing has become more popular, and indeed, as the weight of towed trailers laden with such items as boats, personal watercraft, all-terrain vehicles, camping equipment, and other types of trailer loads has steadily increased, receiver type hitches have migrated into widespread usage with sport utility vehicles, minivans, station wagons, and the like. Unfortunately, receiver hitches are not precisely compatible, in most cases, with the aesthetics of more sophisticated sport utility vehicles. As a result, it has been proposed to provide a cover to hide a hitch receiver when the towing vehicle is not in fact hitched to a trailer. U.S. Pat. No. 6,581,955, which is assigned to the assignee of the present invention, discloses and claims an automotive bumper having an integral hitch receiver and a removable cover. While such a cover does provide a reasonable level of aesthetic appeal when installed upon the bumper assembly, the cover is prone to damage either from being crushed into the ground when the vehicle moves, if it is carelessly left under one of the roadwheels. And, the cover is subject to loss or theft. These shortcomings are occasioned by the fact that the cover is not positively retained upon the vehicle when the cover is not in its installed position.

The present integral tow hitch bumper solves the problems associated with prior art tow hitch bumpers by providing superior aesthetics, and enhanced protection of towing equipment from environmental damage, in the form of a tow bumper having an integral cover which is kinematically retained upon the bumper assembly's bumper cover.

SUMMARY OF INVENTION

A bumper assembly for a motor vehicle includes a bumper beam adapted for attachment to a frame or other vehicle structure, such as rails, a hitch receiver integral with the bumper beam, and a bumper cover for concealing the bumper beam. The bumper cover has an opening for accessing the hitch receiver. An access door is provided for selectively closing the hitch access opening, so as to conceal the hitch receiver. The access door is mounted to the bumper cover such that the access door is movable from a first, or closed, position in which the access door closes the opening such that the hitch receiver is concealed to a second, or open, position which the hitch receiver is accessible for a towing operation and the access door is in a "stored", or open, position. The access door remains attached to the bumper cover in both of these positions i.e. the open and closed positions.

An access door according, to the present invention may be hingedly mounted to the bumper cover or alternatively slidably mounted to the bumper cover. If slidably mounted, the access door may be movable either in a lateral or generally vertical direction. If hinged to the bumper cover, the access door in the would, in a preferred embodiment, be mounted to the bumper cover for rotation about a generally horizontal axis.

According to another aspect of the present invention, the present bumper assembly may be attached to either a front frame portion or a rear frame portion of an automotive vehicle. As used herein, the term "frame" means either a conventional frame used in combination with a separate automotive body, or frame rails or other structures incorporated in a unitized body/frame combination, or a hybrid of the two types of construction.

According to another aspect of the present invention, a method for providing a concealable tow hitch for an automotive vehicle includes the steps of providing a bumper beam which is rigidly attached to a frame of the automotive vehicle, and providing a hitch receiver attached to the bumper beam. The present method further includes the steps of providing a bumper cover for concealing the bumper beam, with the bumper cover having an aperture for accessing the hitch receiver, and finally, providing an access door which is kinematically retained upon the bumper cover and movable between a closed position in which the access door encloses the aperture such that the hitch receiver and other hitch accessories such as a wiring harness are concealed, and an open position in which the hitch receiver is accessible for towing and other uses, and the access door is stored. As used herein, the term "kinematically retained" means that although the access door is free to move with respect to the bumper cover, generally either slidingly or in a rotational fashion, the door remains attached to the bumper cover.

It is an advantage of the present invention that a bumper having a tow hitch may be functionally and aesthetically enhanced through the use of the present access door, which selectively conceals the hitch and which is stored within the bumper itself, so as to avoid loss or damage of the cover.

It is a further advantage of the present invention that the presence of a hitch which may be used for attaching either a trailer, or a bicycle rack, or a winch, or other device at the front of a vehicle may be concealed through the use of the present inventive cover system, so as to allow the aesthetic quality of the front of the vehicle to be greatly improved notwithstanding the provision of hitching capability.

Other advantages, as well as objects and features of the present invention, will become apparent to the-reader of this specification.

DETAILED DESCRIPTION

Figure 1:
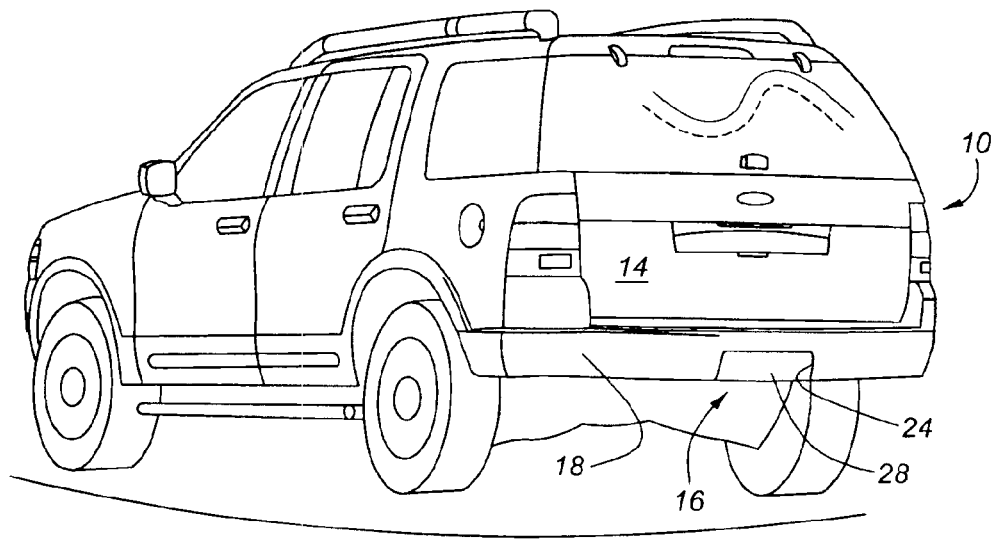
FIG. 1 is a perspective view of the rear portion of a vehicle having a bumper assembly according to the present invention.
Figure 1A:
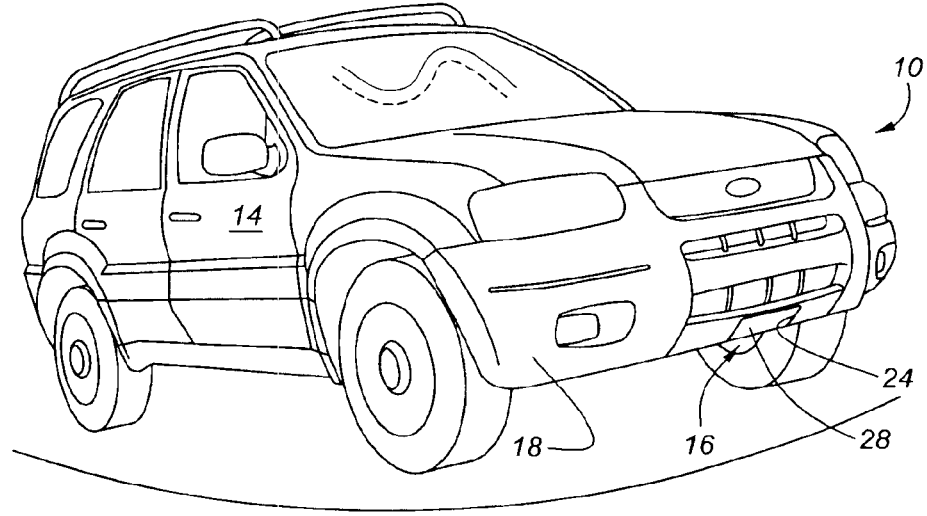
FIG. 1a is similar to FIG. 1 but shows a bumper assembly according to the present invention at the front of a vehicle.

As shown in FIGS. 1 and 1a, vehicle 10 has bumper assemblies 16, with each including bumper cover 18 and access door 28 which closes bumper cover opening 24. As noted above, a bumper assembly, or system, according to the present invention may be mounted at either end of a motor vehicle. This allows not only hitches, but also accessories such as luggage carriers and bicycle carriers, to be mounted at either end of a vehicle.

Figure 2:
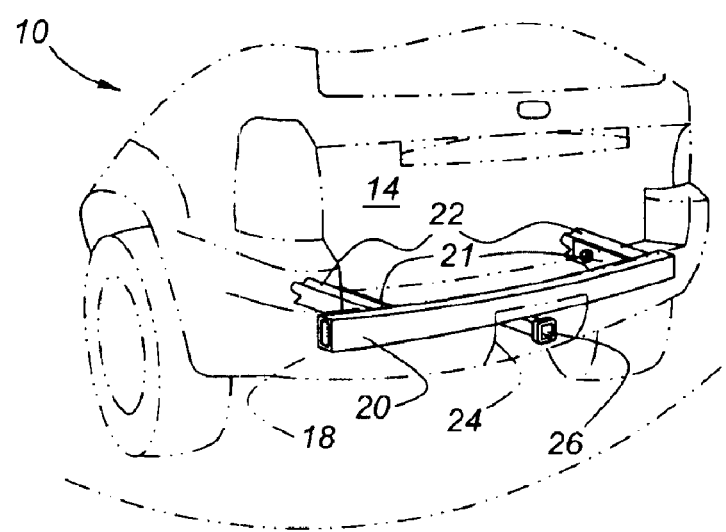
FIG. 2 is a perspective view, partially cut-away, of a bumper system according to the present invention.

FIG. 2 shows bumper beam 20, which may be drawn from a plurality of different types of beams including channel sections, box sections and other types of structural members built from metallic or non-metallic or composite materials known to those skilled in the art and suggested by this disclosure. Regardless of the type of construction of bumper beam 20, it is anticipated that bumper beam 20 will be covered with bumper cover 18. Thus bumper beam 20 will be hidden when access door 28 is applied according to the present invention.

As shown in FIG. 2, Bumper beam 20 is attached to body 14 of vehicle 10 by means of frame siderails 22 and bumper brackets 21. Bumper brackets 21 are either riveted, or bonded, or welded, or bolted, or otherwise joined to bumper beam 20 and are either riveted, or welded, or bolted, or bonded, otherwise joined to frame siderails 22. In the particular embodiment shown in FIG. 2, bumper brackets 21 are bolted to siderails 22 and to bumper beam 20. FIG. 2 also shows hitch 26 which is attached to a lower portion of bumper beam 20 by means of either bonding, welding, or through the use of threaded or unthreaded fasteners, or through a combination of welding, bonding or fasteners. Hitch receiver 26 has a passage therethrough to permit engagement with either a hitch drawbar bearing a hitch ball, or any other type of accessory marketed for use with a receiver hitch. Moreover, those skilled in the art will appreciate in view of this disclosure that a bumper system according to the present invention could incorporate a conventional fixed drawbar, non-receiver type of hitch, which is a lower cost alternative to a receiver hitch. The hitch itself may be either integral with the bumper beam, or otherwise attached by either bonding, or welding, or threaded fasteners, or by other systems known to those skilled in the art and suggested by this disclosure.

Figure 3:
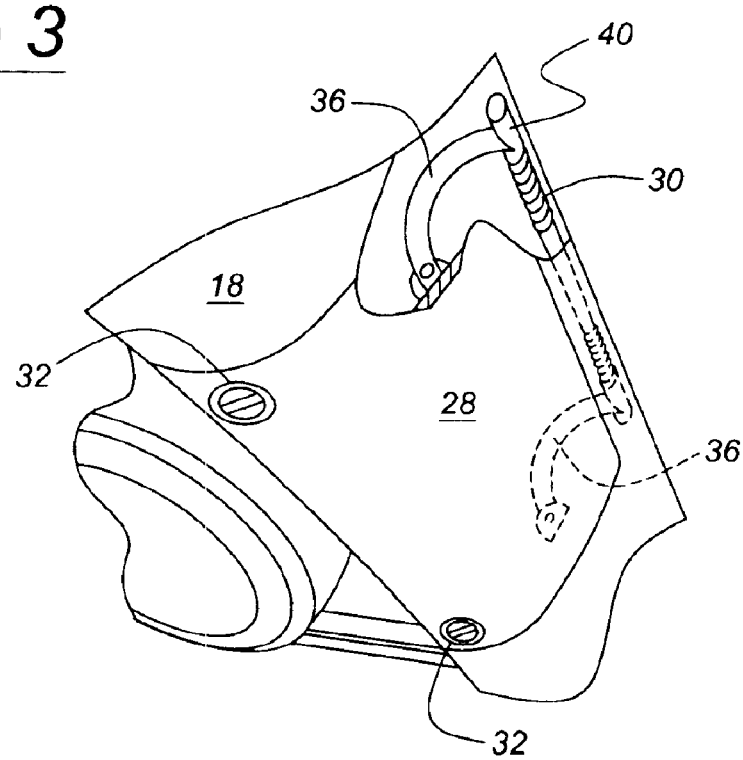
FIG. 3 is a perspective view of a bumper assembly according to the present invention having a first embodiment of an access door according to the present invention.
Figure 4:
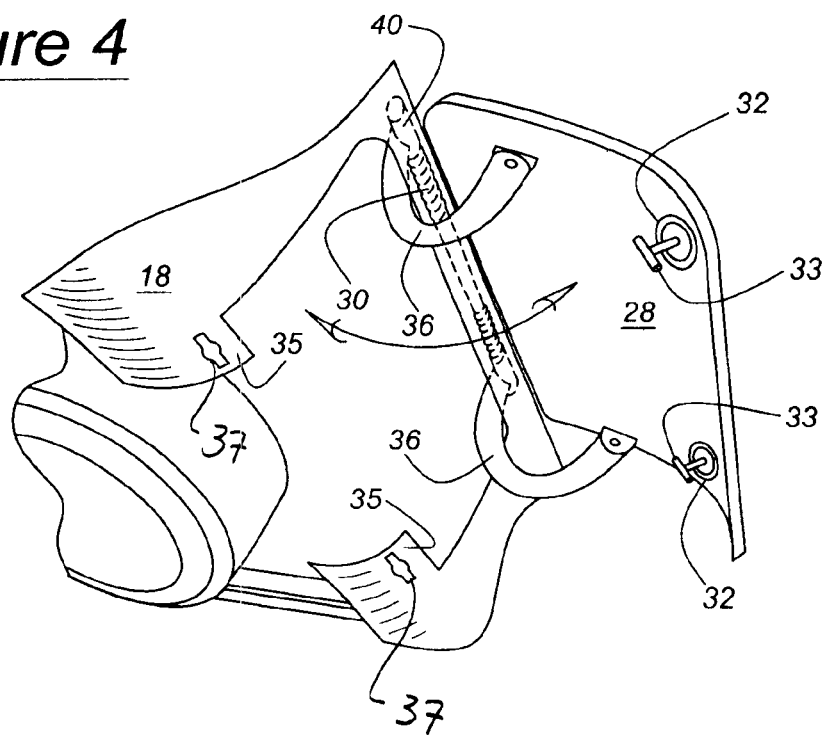
FIG. 4 similar to FIG. 3, but shows the access door of FIG. 3 in an open position.

FIGS. 3 and 4 show details of a first embodiment of an access door 28 according to the present invention. Access door 28 is said to be kinematically retained upon bumper cover 18 because although access door 28 is free to swing upon hinges 36, which are pivoted upon hinge pin 40, so that access door 28 may be rotated upwardly to permit insertion of a drawbar, access door 28 will remain attached to bumper cover 18. Access door 28 of FIG. 3 is also equipped with a torsion spring 30 which drives access door 28 into its upright or open position when twistlock fasteners 32 are mechanically released, either manually or electrically, from a locked to an unlocked position. Fasteners 32 have latch pins 33 extending inwardly from the outer surface of the access door and into apertures 37 formed in tabs 35. When access door 28 is rotated upwardly and into the position shown in FIG. 4, door 28 will not interfere with a tow bar inserted into hitch receiver 26. As an alternative construction, hinge pin 40 may comprise a torsion bar, thereby eliminating the need for a separate torsion spring.

Figure 5:
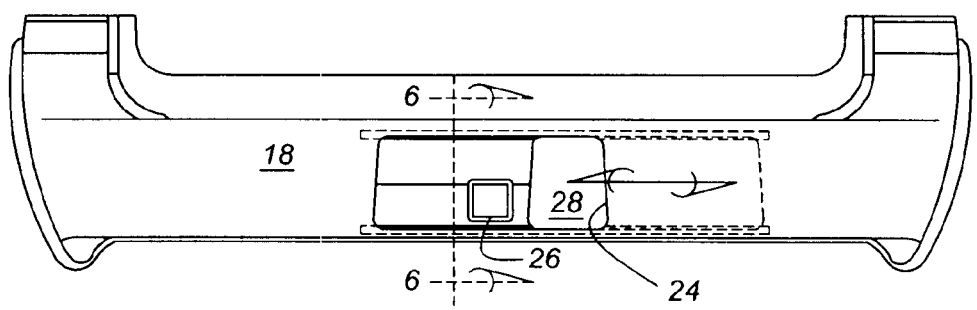
FIG. 5 illustrates a slidable access door according to the present invention, in a partially open position.
Figure 6:
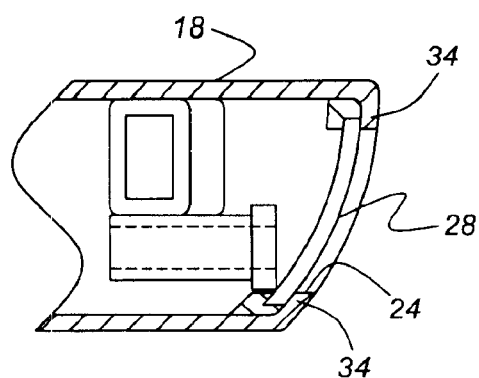
FIG. 6 is a sectional view, partially broken away, of the bumper assembly of FIG. 5, taken along the line of 6—6 of FIG. 5.

FIG. 5 illustrates a sliding access door 28 in a partially open position. The sliding mechanism is shown in FIG. 6, wherein access door 28 is shown as being captured in channels 34 which are formed integrally with upper and lower portions of access opening 24 which is formed in bumper cover 18. As shown in FIG. 5, access door 28 may be freely moved in a track formed by channels 34 to the right in FIG. 5 so as to provide accessibility to hitch receiver 26, while allowing hitch receiver 26 and indeed, bumper cover opening 24 itself to be concealed when hitch receiver 26 is not in use.

Those skilled in the art will appreciate that a bumper assembly according to the present invention with its integral hitch receiver 26 may be used not only for pulling of trailers, but also for attaching a number of devices such as bicycle racks, luggage carriers, coolers and other devices intending to be mounted upon a square receiver hitch.

Figure 7:
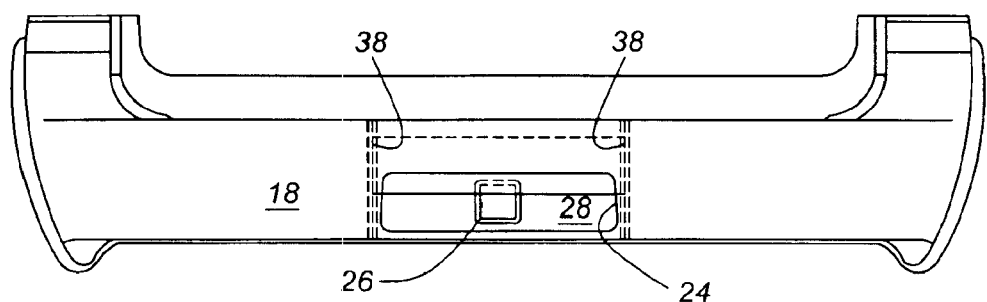
FIG. 7 is an elevational view of a bumper assembly having a generally vertically slidable access door according to the present invention.
Figure 8:
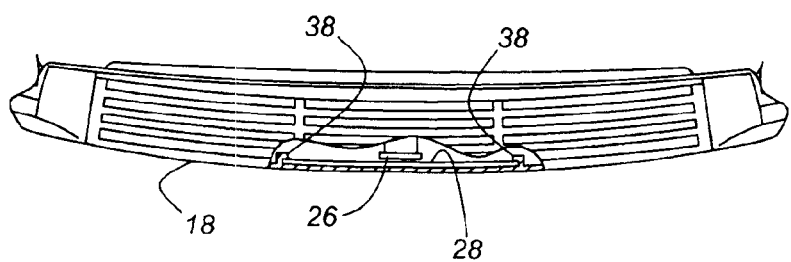
FIG. 8 is a plan view, partially broken away, of the bumper system shown in FIG. 7.

FIGS. 7 and 8 illustrate a second type of sliding access door embodiment in which access door 28 is confined within generally vertically extending channels 38 formed in bumper cover 18 such that access door 28 may be slidably movable in a generally vertical direction so as to allow access to hitch receiver 26.

Although in a preferred embodiment, bumper cover 18 and access door 28 comprise molded plastic, those skilled in the art in view of this disclosure that other types of metallic and non-metallic materials and composites thereof may be used for the purpose of providing a bumper cover and access door according to the present invention. If desired, bumper cover 18 and access door 28 may comprise an integral, one-piece assembly, with door 28 being kinematically retained upon cover 18 by means of a plastic living hinge.

Figure 9:
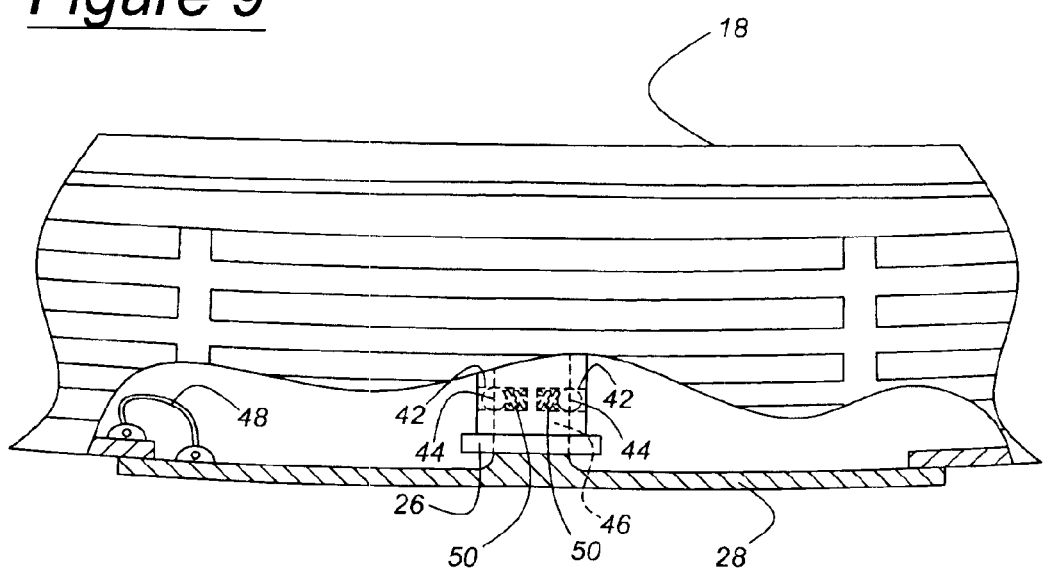
FIG. 9 is a plan view, partially broken away, of an alternative embodiment of a bum-per system showing an access cover mounted to a hitch receiver.

FIG. 9 illustrates another embodiment of the present invention in which access door 28 has an attaching bracket or stem 46 mounted to the inner surface of door 28, with bracket 46 being adapted for telescopic engagement with square-ported hitch receiver 26, and with access door 28 being sized so as to engage the outer surface of bumper cover 18 extending about the periphery of aperture 24, so as go generally close the entirety of aperture 24, thereby concealing hitch receiver 26. Tether 48, which preferably comprises a flexible metallic or non-metallic or composite cable, has a first end attached to door 28 and a second end secured to either bumper cover 18, or to another structural component dictated by design choice. Access door 28 according to FIG. 9 includes bullet latches 44, which are driven by compression springs 50. Latches 44 allow access door 28 to accommodate a limited range of sizes of receiver 26.

According to another aspect of the present invention, a method for providing a concealable tow hitch for an automotive vehicle includes providing a bumper beam as shown, with a hitch receiver mounted to the bumper beam, and then furnishing a bumper cover having an access door which is kinematically retained upon the bumper cover. The access door is movable from a closed position and through a partially open position and into a fully open position. The access door is kinematically retained upon the bumper cover in order that the access door will not become lost or damaged as an unintended result of separation of the access door from the bumper cover.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A bumper assembly for a motor vehicle, comprising:
    a bumper structure comprising;
    a bumper beam for a motor vehicle;
    a hitch receiver attached to said bumper beam;
    a bumper cover concealing said bumper beam, with said bumper cover having an opening for accessing said hitch receiver; and
    an access door selectively concealing said hitch receiver, with said access door being slidably mounted to said bumper structure such that said access door is movable from a closed position in which said access door closes said opening such that said hitch receiver is concealed, to an open position in which said hitch receiver is accessible and said access door is stored, with said access door remaining kinematically retained to said bumper structure in both said closed position and said open position.

2. A bumper assembly according to claim 1, wherein said access door is slidably movable in a lateral direction, with said access door being slidably attached to a plurality of channels formed in the bumper cover.

3. A bumper assembly according to claim 1, wherein said access door is slidably movable in a generally vertical direction.

4. A bumper assembly according to claim 1, wherein said bumper beam is attached to a frame at the front of a motor vehicle.

5. A bumper assembly according to claim 1, wherein said bumper beam is attached to a frame at the rear of a motor vehicle.

6. A bumper assembly according to claim 1, wherein said bumper beam is attached to a rail of a motor vehicle.

7. A method for providing a concealable tow hitch for an automotive vehicle, comprising the steps of:
    providing a bumper beam which is rigidly attached to a frame of the motor vehicle;
    providing a hitch receiver integral with said bumper beam;
    providing a bumper cover concealing said bumper beam, with said bumper cover having an aperture for accessing said hitch receiver; and providing an access door which is slidably attached to channels formed in said bumper cover and movable between a closed position in which said access door encloses said aperture such that said hitch receiver is concealed, and an open position in which said hitch receiver is accessible and said access door is stored.

8. A method according to claim 7, wherein said bumper beam is attached to said frame at the front of the motor vehicle.

9. A method according to claim 7, wherein said bumper beam is attached to said frame at the rear of the motor vehicle.

10. An automotive vehicle, comprising:
    a body having two longitudinal ends;
    a frame extending under said body for at least a portion of the length of said body;
    a bumper beam extending transversely across one of said longitudinal ends of said body; with said bumper beam being attached to said frame;
    a hitch attached to said bumper beam;
    a bumper cover concealing said bumper beam, with said bumper cover having an opening for accessing said hitch; and
    an integral access door for selectively concealing said hitch, with said access door being slidably mounted to said bumper cover such that said access door is slidably movable from a first position in which said access door closes said opening such that said hitch is concealed, to a second position in which said hitch receiver is accessible and said access door is stored, with said access door remaining attached to said bumper cover in both of said first position and said second position.

11. A bumper assembly according to claim 10, wherein said access door is slidably movable in a lateral direction.

12. A bumper assembly according to claim 10, wherein said access door is slidably movable in a generally vertical direction, with said access door being retained upon a plurality of channels formed in said bumper cover.

13. A bumper assembly according to claim 10 wherein said bumper beam is attached to said frame at the front of the motor vehicle.

14. A bumper assembly according to claim 10 wherein said bumper beam is attached to said frame at the rear of the motor vehicle.

15. A bumper assembly according to claim 10 wherein said bumper cover and said access door each comprise molded plastic.

16. An automotive vehicle, comprising:
    a body having two longitudinal ends;
    a frame extending under said body for at least a portion of the length of said body;
    a bumper beam extending transversely across one of said longitudinal ends of said body; with said bumper beam being attached to said frame;
    a hitch attached to said bumper beam;
    a bumper cover concealing said bumper beam, with said bumper cover having an opening for accessing said hitch; and
    an integral access door for selectively concealing said hitch, with said access door being hingedly mounted to said bumper cover, with said door having a spring for driving the door from a first position in which said access door closes said opening such that said hitch is concealed, to a second position in which said hitch receiver is accessible, when a latch is released.

17. A bumper assembly according to claim 16, wherein said spring comprises a torsion bar.

* * * * *